(12) United States Patent
Raz et al.

(10) Patent No.: US 6,606,743 B1
(45) Date of Patent: Aug. 12, 2003

(54) REAL TIME PROGRAM LANGUAGE ACCELERATOR

(75) Inventors: Yair Raz, Sunnyvale, CA (US); Arik Paran, Sunnyvale, CA (US)

(73) Assignee: Razim Technology, Inc., San Jose, CA (US)

( * ) Notice: Subject to any disclaimer, the term of this patent is extended or adjusted under 35 U.S.C. 154(b) by 0 days.

(21) Appl. No.: 09/319,608

(22) PCT Filed: Nov. 13, 1997

(86) PCT No.: PCT/US97/20980
§ 371 (c)(1),
(2), (4) Date: Jun. 8, 1999

(87) PCT Pub. No.: WO98/21655
PCT Pub. Date: May 22, 1998

Related U.S. Application Data
(60) Provisional application No. 60/030,688, filed on Nov. 13, 1996.

(51) Int. Cl.$^7$ .................................................. G06F 9/45
(52) U.S. Cl. ...................... 717/148; 717/148; 712/34; 712/36; 712/202; 711/132
(58) Field of Search ............................ 717/5, 124–161; 711/132, 6; 712/201, 202, 212, 34, 36, 3.26

(56) References Cited

U.S. PATENT DOCUMENTS

| 4,205,370 A | | 5/1980 | Hirtle ........................ 364/200 |
| 4,395,758 A | * | 7/1983 | Helenius et al. .............. 712/34 |
| 4,674,089 A | | 6/1987 | Poret et al. .................... 371/25 |
| 5,126,541 A | | 6/1992 | Shinagawa ................... 235/438 |
| 5,442,777 A | | 8/1995 | Nakajima et al. ....... 395/182.18 |
| 5,889,996 A | * | 3/1999 | Adams ........................ 395/705 |
| 5,937,193 A | * | 8/1999 | Evoy ........................... 395/705 |
| 6,038,643 A | * | 3/2000 | Tremblay et al. ............ 711/132 |

FOREIGN PATENT DOCUMENTS

| JP | 61-6747 | 1/1986 |
| JP | 1-251248 | 10/1989 |
| JP | 4-302329 | 10/1992 |
| JP | 6-202877 | 7/1994 |

OTHER PUBLICATIONS

Brian Case, "Implementing the Java Virtual Machine; Java's Complex Instruction Set Can Be Built In Software Or Hardware", Mar. 25, 1996, v10 n4 p12 (6), 9 pgs. *Microprocessor Report.*

Peter Wayner, "Sun Gambles On Java Chips", Nov. 1996, v21 n11 p79 (6), 8 pgs., *Byte.*

* cited by examiner

Primary Examiner—Gregory Morse
Assistant Examiner—Chuck Kendall
(74) Attorney, Agent, or Firm—Austin Boyce Oppenheimer Wolff & Donnelly LLP

(57) ABSTRACT

A computer system for accelerated processing of stack oriented interpretive language instructions comprising a translator which establishes correlations between address values and core operations, a processing accelerator core for performing core operations, a cache memory for storing operand data, a control logic device for reading and writing operand data and for determining core operations corresponding with address values and an arithmetic logic unit for receiving data and performing core operations, being specified solely by address values.

25 Claims, 5 Drawing Sheets

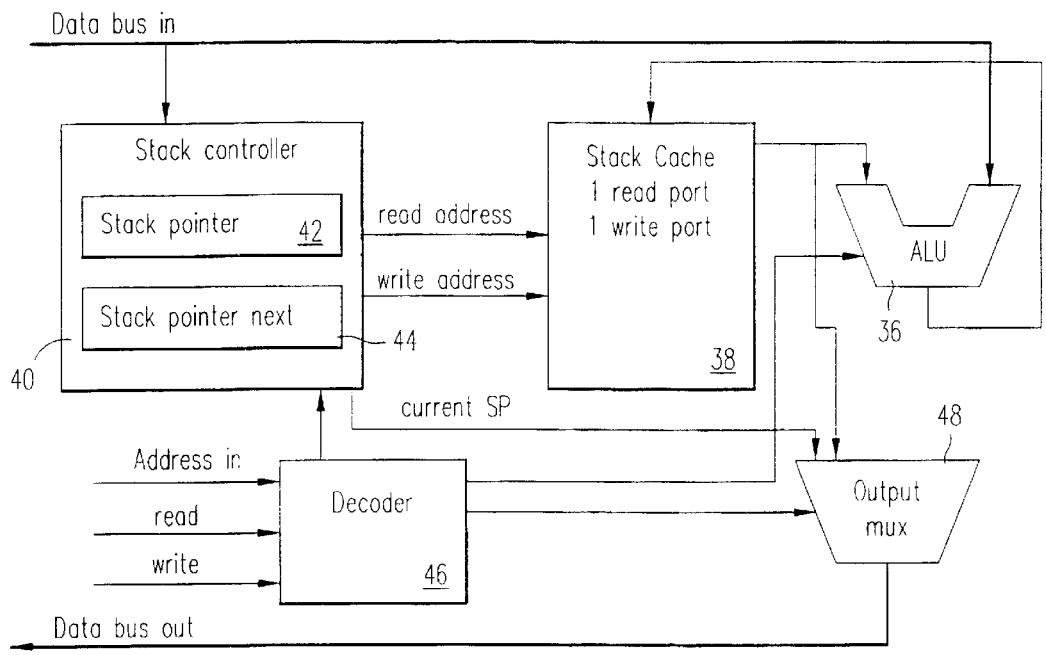
FIG. 3
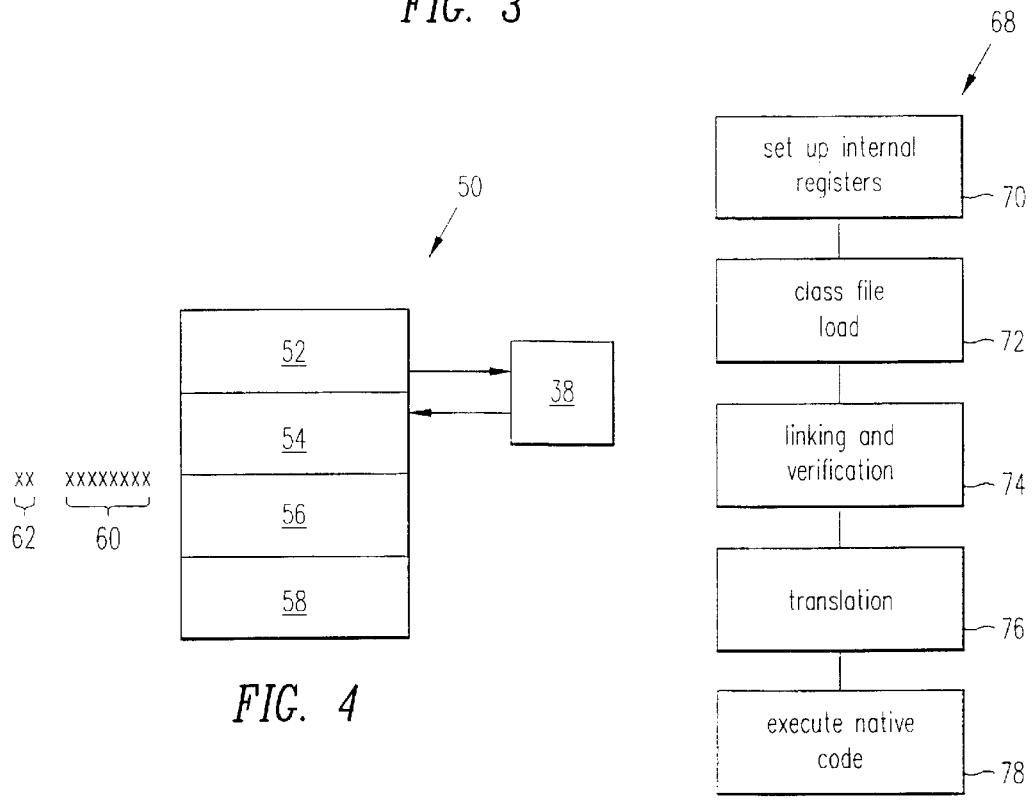
FIG. 4
FIG. 5

REAL TIME PROGRAM LANGUAGE ACCELERATOR

CROSS REFERENCE TO RELATED APPLICATIONS

This application is a PCT National Phase entry of PCT/US97/20980, filed on Nov. 13, 1997, which itself claims priority from U.S. Provisional Patent Application Serial No. 60/030,688, filed Nov. 13, 1996.

TECHNICAL FIELD

The present invention relates to the field of computer processing and more specifically to the real time interpretation and operation of computer code using a combination of unique hardware and software. The predominant current usage of the present inventive real time program language accelerator is in the execution of Java™ code wherein it is desirable to be able to run such code at high execution speed on a variety of different processors.

1. Background Art

It is known in the art to provide interpreters for converting higher level computer languages into machine readable code in near real time. However, such interpreters must necessarily slow down the operation of the program being run at least at some point in during the loading and running of the program. In particular, regarding the Java™ program language, the several available solutions for running Java™ programs, including the "Java™ Virtual Machine" are software based programs which require execution in order to accomplish their tasks.

It would be beneficial to have a method and/or means for running Java™ code on any available type of processor. Also, it would be beneficial to have some method and/or means for processing the Java™ code such that it will actually run faster than it otherwise would, or at least that would not slow down the overall process of interpreting and running the Java™ code. However, to the inventor's knowledge, no system for accomplishing these objectives has existed in the prior art. Indeed, although software solutions such as the Java™ Virtual machine do attempt to optimize the operation of the code, a limitation has been the characteristics of the particular processor and system on which the code is to be run.

2. Disclosure of Invention

Accordingly, it is an object of the present invention to provide a method and means for easily running a non-native program language on virtually any type of processor.

It is still another object of the present invention to provide a method and means for accelerating the operation of Java™ program code.

It is yet another object of the present invention to provide ad method and means for translating and executing Java™ code which is easily implemented in hardware.

It is still another object of the present invention to provide a method and means for translating and executing Java™ code which will not detract from the ability of the computer system to execute non-Java™ code.

Briefly, the preferred embodiment of the present invention is an integrated circuit "program language accelerator core" which can be embodied as part of a CPU chip, on a separate chip, or even on a separate board. The program language accelerator core has a dedicated hardware stack memory for directly providing the stack memory which is required to be either present or emulated for the execution of Java™ code. A direct memory access ("DMA") controller is also provided for shifting data into and out of the stack memory as overflow and underflow conditions (or other specified conditions) occur. A software portion of the invention translates the Java™ code into a machine native language code, and also optimizes the code to perform unique inventive functions as required, such as writing to a memory address which is predetermined to perform specified functions. In this manner, operations that might otherwise take several clock cycles can be performed in a single (or at least fewer) clock cycles.

An advantage of the present invention is that the speed of execution of Java™ code is greatly increased.

A further advantage of the present invention is that Java™ code can be readily executed on essentially any type of processor.

Yet another advantage of the present invention is that it can be easily and inexpensively implemented such that even affordably priced computers can be optimized for the execution of Java™ code.

Still another advantage of the present invention is that it is not difficult or expensive to adapt to new types of processors such as might become available.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWINGS

FIG. 3 is a more detailed block diagram of the intelligent stack of FIG. 1;

FIG. 4 is a memory map of the intelligent stack depicted in FIGS. 1 and 3;

FIG. 5 is a flow diagram of one aspect of the inventive process;

BEST MODE FOR CARRYING OUT INVENTION

Figure 1:
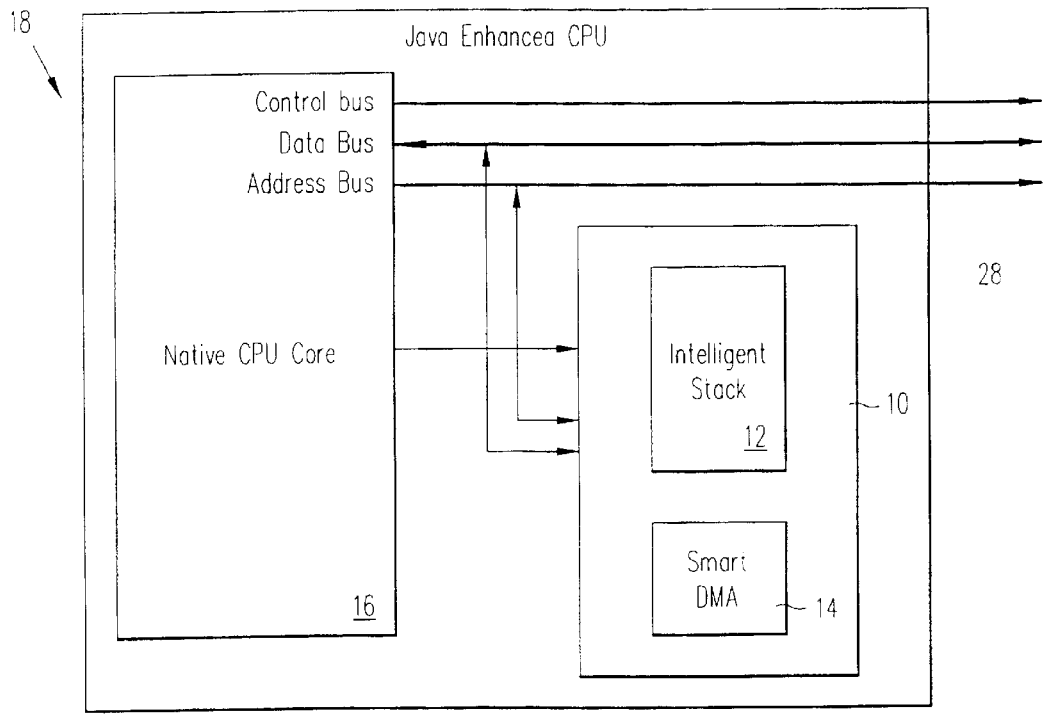
FIG. 1 is a block diagram of an integrated circuit having thereon a program language accelerator core according to the present invention.

The best presently known mode for carrying out the invention is a real time accelerator core. The inventive real time accelerator core is depicted in a block diagrammatic view in FIG. 1 and is designated therein by the general reference character 10.

The real time accelerator core has 10 has an intelligent stack 12 and a smart DMA controller 14. The real time accelerator core 10 will allow real time translation and execution of Java™ object code by any target native CPU 16 such that the native CPU can execute Java™ programs without any additional software based translation or interpretation in a much higher performance mode (compared to the standard Java™ interpreter or JIT compilers). It should be noted that, in the example of FIG. 1, the program language accelerator core 10 and the CPU are embodied on a single CPU chip 18 although, as previously discussed herein, this is not a necessary aspect of the invention.

Figure 2:
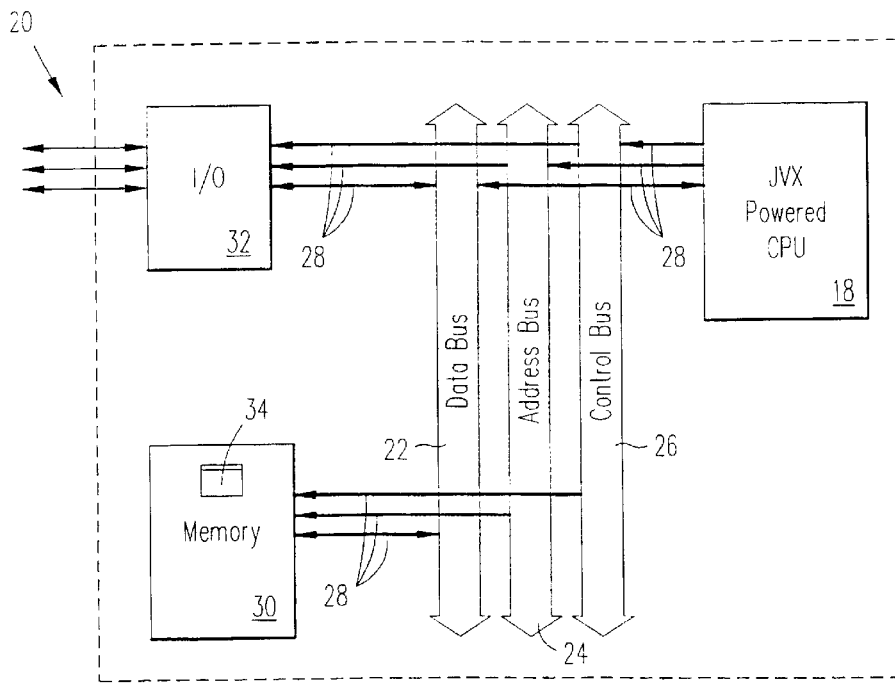
FIG. 2 is a block diagram showing an example of how an CPU enhanced according to the present invention might be integrated into a computer system.

FIG. 2 is a diagrammatic example of a typical computer configured for operation with the CPU chip 18 having therein the program language accelerator 10. It will be noted that the connections of the CPU chip 18 within the computer are not significantly different from those of a comparable conventional prior computer (not shown). A data bus 2, an address bus 24 and a control bus 26 are each provided with the appropriate data paths 28 for communicating with the CPU chip 18, a (RAM) memory 30 and an I/O section 32.

The data bus 22 is the native CPU data bus. The width of the data bus 22 should be the natural data bus width of the native CPU 16 (8, 16, or 32 bits). The interface logic in the program language accelerator core 10 will take care of any data width related tasks. The address bus 24 is the native CPU address bus. The width of the address bus 28 should be the natural address bus width of the native CPU 16. The control bus 26 will carry the several control signals that can be found in any CPU: Clock, Reset, Read and Write, interrupt lines, bus request, etc.

It should be noted that the example of FIG. 2 is provided only to show the context in which inventive program language accelerator core 10 might be used, and is not intended to disclose an inventive aspect of the invention. In operation, the memory 30 will contain the required initialization software for the native CPU 16 (FIG. 1), an operating system (if used), I/O device drivers or control code, as well as a program language accelerator software 34 the functions of which will be discussed in greater detail hereinafter. In addition, the memory 30 can contain any compiled Java™ code required (specific custom class libraries, for example).

Depending on the end user's application, the computer 20 equipped with the inventive program language accelerator core 10 and the program language accelerator software 34 can execute any Java™ code which already exists in non-volatile memory, or load it through the applicable I/O devices (communication ports, disk, etc.).

The program language accelerator core 10 takes advantage of the fact that the Java™ Virtual Machine is a stack based machine emulation, and most stack operations on a contemporary CPU (such as the native CPU core 16 of FIG. 1) take more than 1 clock cycle to complete. The intelligent stack 12 is essentially a large virtual cache for the Java™ Virtual Machine stack. The DMA controller 14 (FIG. 1) keeps the cache consistent if a stack overflow or underflow would occur due to the limited size of the actual cache, as will be discussed in greater detail hereinafter.

FIG. 3 is a more detailed block diagram of the intelligent stack 12 previously discussed herein in relation to FIG. 1. In the view of FIG. 3 it can be seen that the intelligent stack 12 has a simple internal arithmetic logic unit ("ALU") which allows the pushing of constants as defined by the Java™ Virtual Machine specification, along with the operations that update the tops of the stack such as iadd or iinc, all of which will be familiar to one skilled in the implementation of the Java™ Virtual Machine. A cache 38 is the actual cache memory within the intelligent stack. A stack controller 40 has a stack pointer 42 and stack pointer next 44 such as are found in conventional stack control devices. A conventional decoder 46 is provided for decoding addresses and instructions and an output MUX 48 provides output from the source within the intelligent stack 12 which is appropriate to the operation.

The intelligent stack 12 is a 64×32-bit register file configured to be used as a stack. The intelligent stack 12 is memory mapped into the native CPU 16 memory address space, and allows the native CPU 16 fast stack operation (push, pop), and also random access to any one of the registers. The intelligent stack 12 provides circuitry for automatic stack overflow/underflow detection. The smart DMA controller 14 is configured to read and write the content of the entire intelligent stack 12 to or from the memory 30, such as when it is required to shift between different tasks. The smart DMA controller 14 also corrects potential stack overflow or underflow by temporarily storing any excess of data from the intelligent stack 12 to the memory 30. The smart DMA will dump a block of words to main memory 30 when the stack approaches overflow (on Push operation), or will load a block of words from main memory 30 when the stack approaches underflow (on Pop operation). The smart DMA controller can load a local variable from main memory 30 (on Variable Load miss), store a local variable to main memory 30 (on Variable Store miss), dump the entire cache 38 to main memory 30 to prepare for a context switch, or load the entire cache 38 from memory 30 to perform a context switch. The smart DMA can also optionally be used to accelerate thread context switching by moving data into and out of the cache 38, as required.

It should be noted that the inventive program language accelerator 10 could be made to operate without the smart DMA controller 14, although the addition of the smart DMA controller 14 does significantly increase the usefulness and functionality of the program language accelerator 10.

Since Java™ operations are based on a stack machine architecture, the program language accelerator software 34 is required to perform only a very simple translation of the Java™ code to native CPU code. The translation is done using the support language accelerator software 34, preferably as the Java™ code is loaded. Optimization according to the present invention will be provided during the translation by methods including the present inventive method of providing that certain operations be directed to certain memory addresses, as will be discussed in more detail hereinafter. Since the native CPU 16 does not need to deal with stack management (which is handled by the intelligent stack 12), very high speed execution of Java™ programs is possible.

According to the present invention data will come from the data bus 22 and flow onto the top of the stack (much as a conventional stack operation) or else will have an arithmetic operation including the value at the top of the stack and then replace or push onto the top of the stack. Unique to the present invention is the fact that all of the operations are determined by the addresses used. The intelligent stack 12 occupies four times the address space of the cache 38. That is, four times the number of addresses are mapped to memory of the CPU chip 18 than are required to fully address all of the actual memory locations in the intelligent stack 12. The size of the cache in the best presently known embodiment 10 of the present invention is 64 words so the intelligent cache 12 occupies 256 locations in this embodiment.

FIG. 4 is a simple memory map 50 of the memory addresses occupied by the intelligent stack 12. In the view of FIG. 4 it can be seen that the memory map 50 has a first area 52, a second area 54, a third area 56 and a fourth area 58. Of these, only the first area 52 relates directly to the physical cache 38. A complete address 60 for addressing the memory map 50 will have two select area bits 62 for selecting which of the areas 52, 54, 56 or 58 is to be addressed and an 8 bit select byte 64 for addressing specific data locations within the respective areas. Since each of the four areas 52 allows different operations to be execute by reading or writing to an address therewithiin, the upper two address bits (the select area bits 62) of program language accelerator core 10 determines which area 52, 54, 56 or 58 is addressed, and so determines the major operation mode of the device.

Table 1, below, provides a general description of the operations which are performed when the native CPU 16 addresses each of the four areas 52, 54, 56 and 58 of the memory map 50.

TABLE 1

| Upper Address Bits | program language accelerator core Major Operation Areas |
|---|---|
| 00 | Direct access to hardware stack (cache) data. |
| 01 | Access to Configuration and Control Registers |
| 10 | Read: Pop value from stack. Write: Push value constant into stack (depending upon address within the area. |
| 11 | Read: Undefined Write: Replaces TOS with the required operation's result. Operation is performed on TOS and the data written Operation depends upon address within the area. |

Briefly, values written to the first area 52 of the memory map 50 may be directly written or read by the native CPU 16 at the base address of the device. The second area 54 is used for the configuration and control registers. The third area 56 is used for push and pop operations. The fourth area 58 is used for arithmetic operations that replace the value at the top of the stack. The decoder 46 looks at the incoming address request and thereby automatically determines the operation, the correlation between address and operation having been previously established during translation by the program language accelerator software 34. The data busses and timing are generic single cycle busses where the address, read and write signals are valid on the clock, and read data is expected by the following clock.

FIG. 5 is a flow diagram 68 depicting the general operation of the computer 20 according to the present inventive method. Whenever the computer 20 is restarted, specific initialization is done by the native CPU 16: Setting up hardware devices, initializing the operating system (if used), executing any required startup program, and so on. These programs are written in the native CPU 16 language (e.g. instruction set) and are executed by the native CPU 16 directly. These are done without any connection to Java™ and/or program language accelerator core 10. Also, in a set up internal registers operation 70 the native CPU will initialize memory registers, including those that are set aside for addressing the program language accelerator core 10. This is the initial phase of operation when the user invokes and starts the Java™ Execution Environment. During initialization of the Java™ Virtual Machine, the Java™ Virtual Machine will detect the existence of program language accelerator core 10 and its support software (the program language accelerator software 34), and initializes both of them. Among the various initializations done at this phase, some of the most important are setting the various Configuration Registers of program language accelerator core 10 (as described in herein in relation to the second area 54 of the memory map 50.

Any required native program might then be executed by the computer 20. This is also done directly by the native CPU 16 without any operation required by program language accelerator core 10. (These operations are not shown in the flow diagram 68 of FIG. 5, and are mentioned here only to put the flow diagram 68 in the correct context.

When a Java™ class file needs to be executed (either it exists already in memory, or it needs to be loaded from disk or received form a communication line), the Native CPU 16 uses the JVM class loader and the program language accelerator software 34 to load, prepare, perform translation, and start executing the required file. This process is made of several steps which will be describe in details in the following sections: In a class file load operation 72, a Java™ class file is loaded. This part is executed entirely by the standard Java™ Virtual Machine code, as described in "The Java™ Virtual Machine Specification". In a linking and verification operation 74, linking, verification, preparation and resolution are performed conventionally by the Java™ Virtual Machine linker. This part is also executed entirely by the standard Java™ Virtual Machine code.

Following, in a translation operation 76, the native CPU 16 locates the class file's implementation code (e.g. the Java™ Virtual Machine byte code which implements the class), translates it to native instructions, and loads it to an execution area in the memory 30. This part is done entirely by the program language accelerator software 34. The purpose of the translation phase is to convert the Java™ byte code (which was loaded and linked in the previous phases) to the native CPU instruction streams, suitable to operate program language accelerator core 10. Since, as described herein, reading or writing from/to special memory locations invokes all of program language accelerator core 10 operations, the translated native code will mostly contain read and write instructions from/to the various memory areas of program language accelerator core 10. The specific translation of byte code to native code depends on the native CPU that is attached to program language accelerator core 10. The translated code is stored in the memory 30. Once a class file is fully translated, the original byte code image can be discarded, and only the translated native code will be used.

Once the loading process is complete, the native CPU 16 will perform a branch (jump) to the entry point of the translated native code and will start executing the class initialization code, which is now a native program with instruction sequences that take advantage of program language accelerator core 10 dedicated hardware stack and logic, as discussed throughout this disclosure. This is indicated by an execute native code operation 78 in the flow diagram 68 of FIG. 5.

Further details of the operation of the inventive method occurring within the execute native code operation 78 will be discussed in relation to additional flow diagrams hereinafter. These operations and respective flow diagrams are as follows: A value push operation 80 (FIG. 6) and a value pop operation 82 (FIG. 7). both of which relate to operations which occur when the native CPU 16 addresses the second area 54 of the memory map 50 of the intelligent stack 12. A constant push operation 84 (FIG. 8) also relates to operations which occur when the native CPU addresses selected locations of the second area 54 of the memory map 50 of the intelligent stack 12. (One familiar with Java™ will recognize that there is no need for an equivalent "constant pop" operation.)

Figure 10:
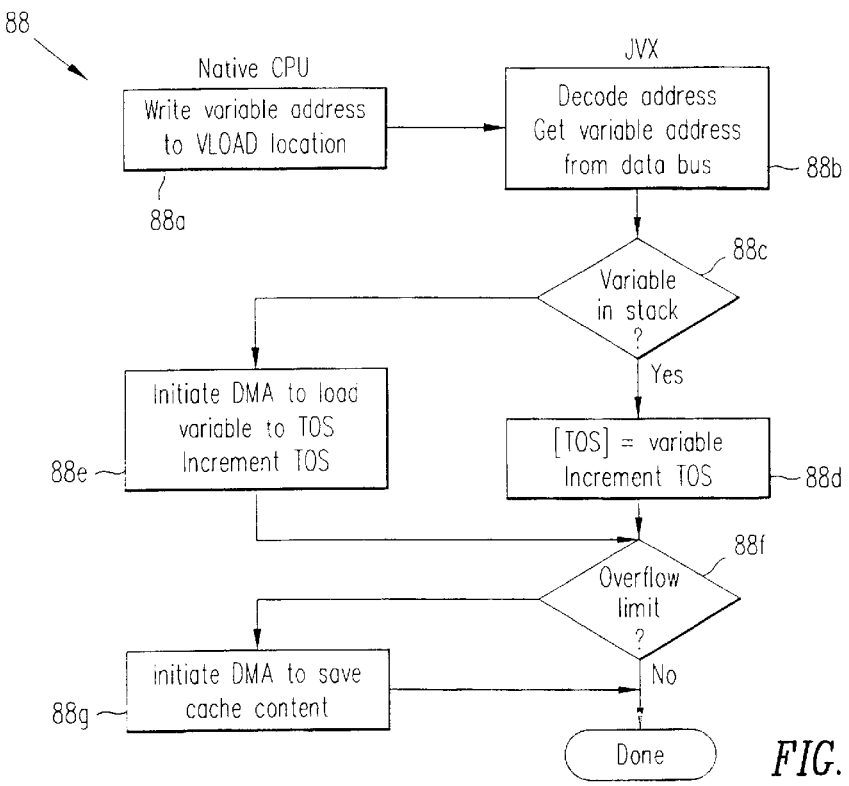
FIG. 10 is a flow diagram of a local variables load operation according to the present invention.
Figure 11:
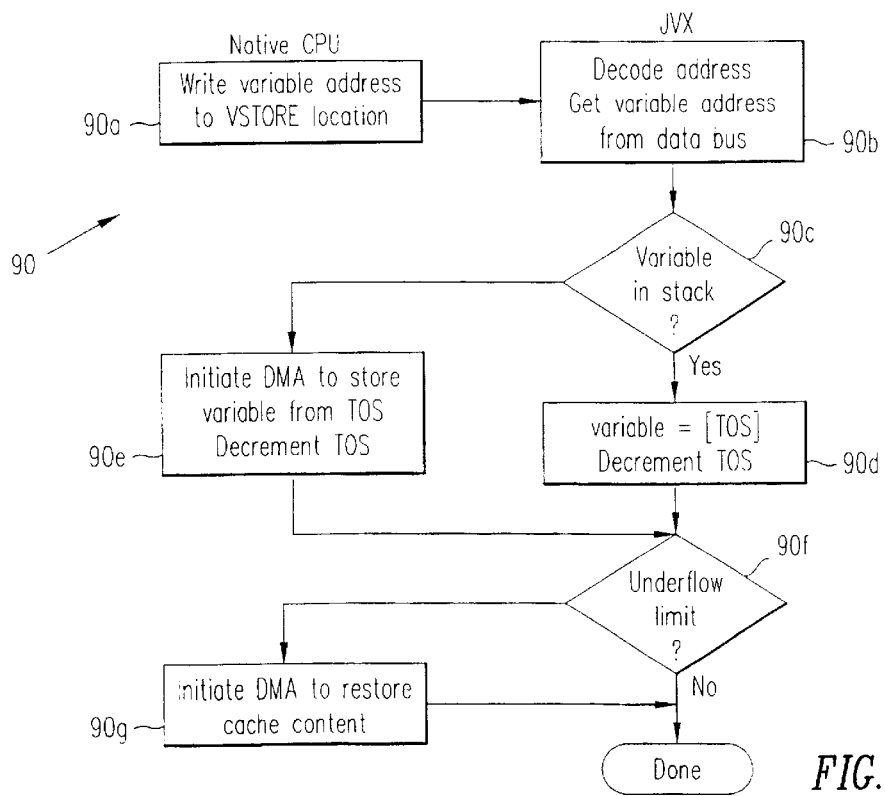
FIG. 11 is a flow diagram of a local variables store operation according to the present invention.

An arithmetic operations 84 flow diagram (FIG. 9) describes operations which occur in the program language accelerator core 10 when selected areas of the third area 54 of the memory map 50 are addressed. A local variables load operation 88 (FIG. 10) and a local variables store operation 90 (FIG. 11) describe these respective functions and will provide more detail about the operation of the smart DMA controller 14.

Returning now again to a discussion of the different functioning of the four areas 52, 54, 56 and 58 of the memory map 50 introduced previously herein, it will be remembered that, in the best presently known embodiment 10 of the present invention, the program language accelerator core 10 contains 64 words in its hardware intelligent stack 12. This address space is divided into the four major areas 52, 54, 56 and 58, each of which allows different operations to be executed by reading or writing to an address therewithin. Regarding the first area 52 of the memory map 50, this area acts as one skilled in the art would expect the memory map 50 to behave were this the only area of the memory map—that is, if there were a one to one correlation between the addresses of the memory map 50 and the cache 38. The first area 52 of the memory map 50 is provided to allow read and write access to any of the hardware stack registers (64 32-bit registers) as though they were random access memory.

Regarding the second area 54 of the memory map 50, the registers in this area control the operation of the program language accelerator core 10. These registers have read and write access. This area contains four special write-only e locations, also. Two of the write only locations are used for variable operations and two are used for context switching. Addressing any of these registers is done via the low address bits of the native CPU 16. Table 2. below is a listing of the applicable registers within the second area 54 of the memory map 50.

TABLE 2

| Address | Register | Register or Function |
|---|---|---|
| 0 | SP | Stack Pointer. |
| 1 | BOSP | Bottom of Stack Pointer. |
| 2 | WLIMIT | Upper limit in main memory where the stack can be written to. |
| 3 | RLIMIT | Lower limit in memory where the stack can be read. |
| 4 | VREG | Variable Address Register. This location can be written or read for testing purposes. It is automatically written with the address of the last accessed variable. |
| 5 | SWAPINSIZE | Swap-in Size. This register controls how many words will be read in when a swap-in DMA cycle is started. |
| 8 | VLOAD | Variable Load. This register has write only access. When this special location is written, the data bus has the absolute address of a local variable that should be pushed on to the top of the stack. A DMA cycle is started if the variable is not in the cache. If the variable is in the cache, one additional cycle is taken to transfer the contents to the top of the stack |
| 9 | VSTOTE | Variable Store. This register has write only access. When this special location is written, the data bus has the absolute address |

TABLE 2-continued

| Address | Register | Register or Function |
|---|---|---|
| | | of local variable that should get the value from the top of the stack. A DMA cycle is started if the variable is not in the cache. If the variable is in the cache, one additional cycle is taken to transfer the contents to the top of the stack |
| 14 | SWAPIN | Swap-in. This register has write only access. When this special location is written, the value on the data bus is ignored and a block mode DMA cycle is started to fill the cache from main memory. The number of word read depends on the value of the SWAPINSIZE register, so this may be tuned for a specific state of a thread |
| 15 | SWAPOUT | Swap-out. This register has write only access. When this special location is written, the value on the data bus is ignored and a block mode DMA cycle is started to flush the cache to main memory. The number of word read depends on the value of SP and BOSP |

Regarding the third area 56 of the memory map, this area is used for pushing values or constants to the stack or popping values from the stack. The operation to be performed is determined by the low address bits of the processor (the select byte 62). That is, the address determines the operation to be performed. These functions are listed below in table 3. One skilled in the art will recognize that, in some instances, the value of data provided by the native CPU 16 to the program language accelerator core 10 will be irrelevant, since the operation is performed using a constant value.

TABLE 3

| Address | Operation | Operation Description |
|---|---|---|
| 0 | PUSHPOP | Pushes the value on the data bus to the stack (write operation) or pops a value from TOS to the data bus (read operation). |
| 2 | ICONSTml | Write only location. Pushes a constant integer (−1) |
| 3 | ICONST0 | Write only location. Pushes a constant integer 0 |
| 4 | ICONST1 | Write only location. Pushes a constant integer |
| 5 | ICONST2 | Write only location. Pushes a constant integer 2 |
| 6 | ICONST3 | Write only location. Pushes a constant integer 3 |
| 7 | ICONST4 | Write only location. Pushes a constant integer 4 |
| 8 | ICONST5 | Write only location. Pushes a constant integer 5 |
| 11 | FCONST0 | Write only location. Pushes a constant float 0.0 |
| 12 | FCONST1 | Write only location. Pushes a constant float 1.0 |
| 13 | FCONST2 | Write only location. Pushes a constant float 2.0 |

Regarding the fourth area 58 of the memory map 50, this area is used to initiate arithmetic operations on the value at the Top-Of-Stack. The value at the top of the stack is replaced with the result of an arithmetic operation between value on the data bus the current value at the Top-Of-Stack. The arithmetic operation to be performed is determined by the low address bits of the processor (the select byte 62). All of these operations are performed on integer values (32-bit integers). These functions are listed in table 4, below.

TABLE 4

| Address | Operation | Arithmetic Operation Description |
|---|---|---|
| 16 | IADD | Write only location. Adds the value at the top of the stack to the value on the data bus. replacing the value at the top of the stack. |
| 17 | ISUB | Write only location. Subtracts the value on the data bus from the value at the top of the stack, replacing the value at the top of the stack. |
| 18 | INEG | Write only location. Subtracts the value at the top of the stack from 0, replacing the value at the top of the stack. Ignores the value on the data bus. |
| 19 | IOR | Write only location. Performs a bit-wise OR on the value at the top of the stack with the value on the data bus, replacing the value at the top of the stack. |
| 20 | IAND | Write only location. Performs a bit-wise AND on the value at the top of the stack with the value on the data bus, replacing the value at the top of the stack. |
| 21 | IEXOR | Write only location. Performs a bit-wise Exclusive-OR on the value at the top of the stack to the value on the data bus, replacing the value at the top of the stack |
| 22 | IINCR | Write only location. Adds 1 to the value at the top of the stack, replacing the value at the top of the stack. Ignores the value on the data bus. |

Figure 6:
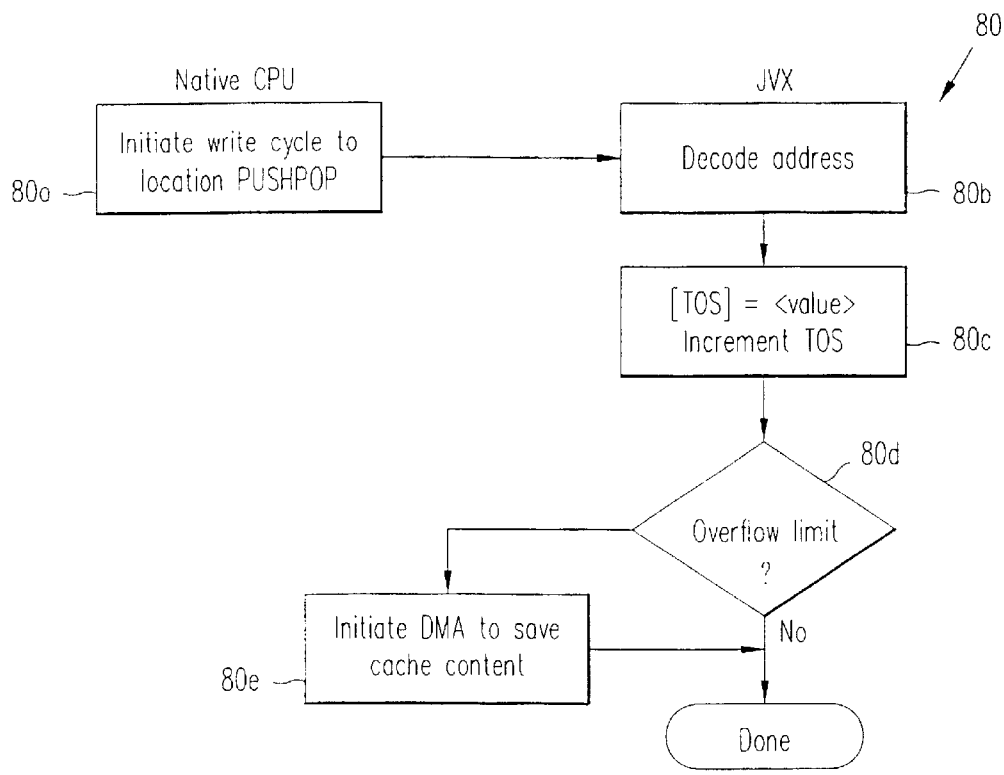
FIG. 6 is a flow diagram of a value push operation according to the present invention.

Referring now to the value push operation 80 shown in FIG. 6, when the program language accelerator software 34 has translated and optimized the Java™ code regarding a value push operation, and it is time for such operation to be executed, the value will be written to the location "pushpop" (see Table 3) in operation 80*a*. In an operation 80*b*, the address is decoded (by the decoder 46—FIG. 3) the value is so directed. Then, in an operation 80*c* the value written from the data bus (FIG. 2) is written into the hardware stack (the cache 38—FIG. 3) at the location pointed by its TOS register, and the TOS is incremented. If the hardware stack (cache 38) approaches overflow, as determined in a decision operation 80*d*, then the smart DMA controller 14 is initiated to save a portion of the content of the cache 38 to the memory 30 (FIG. 2) in an operation 80*e*.

Figure 7:
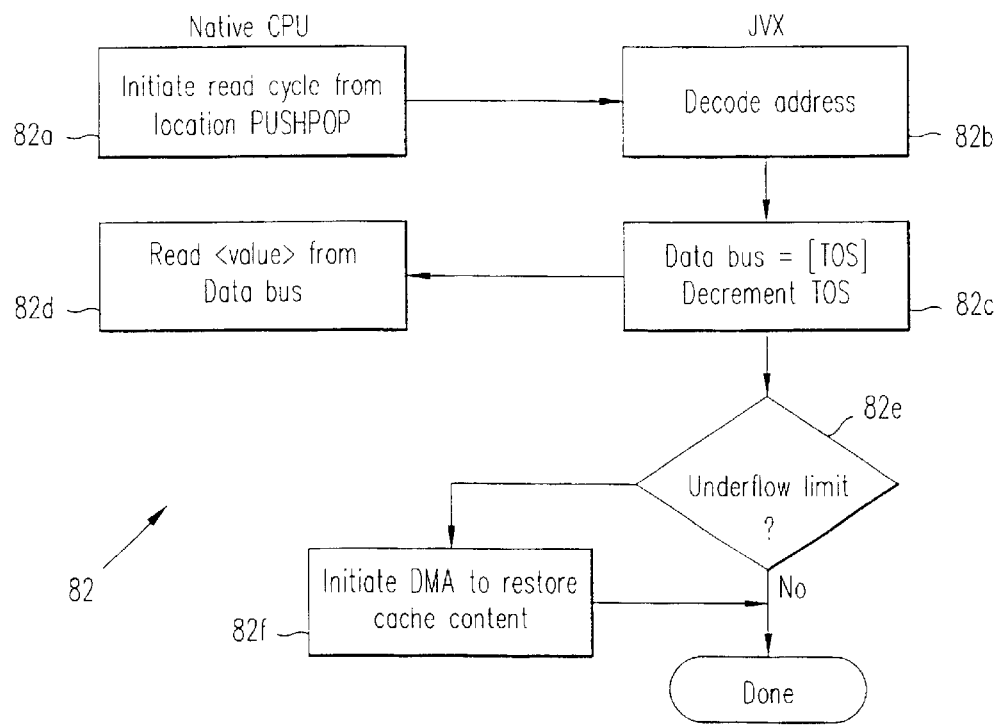
FIG. 7 is a flow diagram of a value pop operation according to the present invention.

Referring now to the value pop operation 82 shown in FIG. 7, when the program language accelerator software 34 has translated and optimized the Java™ code regarding a value pop operation, and it is time for such operation to be executed, the read command will be directed to the appropriate location in operation 82*a*. In an operation 82*b*, the address is decoded (by the decoder 46—FIG. 3). Then, in an operation 82*c* the value read (popped) from the cache 38 (FIG. 3) and the TOS pointer is decremented. The value is sent to the data bus (FIG. 2) in an operation 82*d*. If this leaves the hardware stack (cache 38) in an underflow condition, as determined in a decision operation 82*e* (that is, if the cache 38 has reached a predetermined level of non-use), then the smart DMA controller 14 is initiated to restore a portion of the content of the cache 38 from the memory 30 (FIG. 2) in an operation 82*f*.

Figure 8:
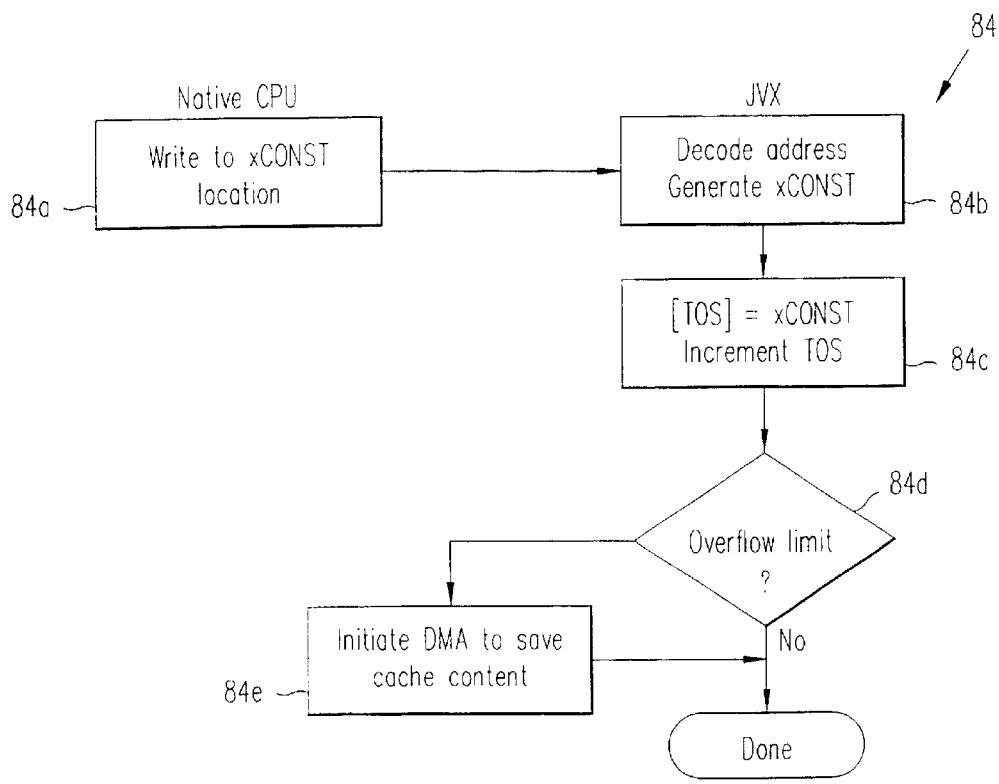
FIG. 8 is a flow diagram of a constant push operation according to the present invention.

Referring now to the constant push operation 84 shown in FIG. 8, when the program language accelerator software 34 has translated and optimized the Java™ code regarding a constant push operation, and it is time for such operation to be executed, the write command will be directed to the appropriate location in operation 84*a*, In an operation 84*b*, the address is decoded (by the decoder 46—FIG. 3). Then, in an operation 84*c* the constant value dictated by the particular address selected is written (pushed) into the hardware stack (the cache 38—FIG. 3) at the location pointed by its TOS register, and the TOS is incremented. If the hardware stack (cache 38) approaches overflow, as determined in a decision operation 84*d*, then the smart DMA controller 14 is initiated to save a portion of the content of the cache 38 to the memory 30 (FIG. 2) in an operation 84*e*.

Figure 9:
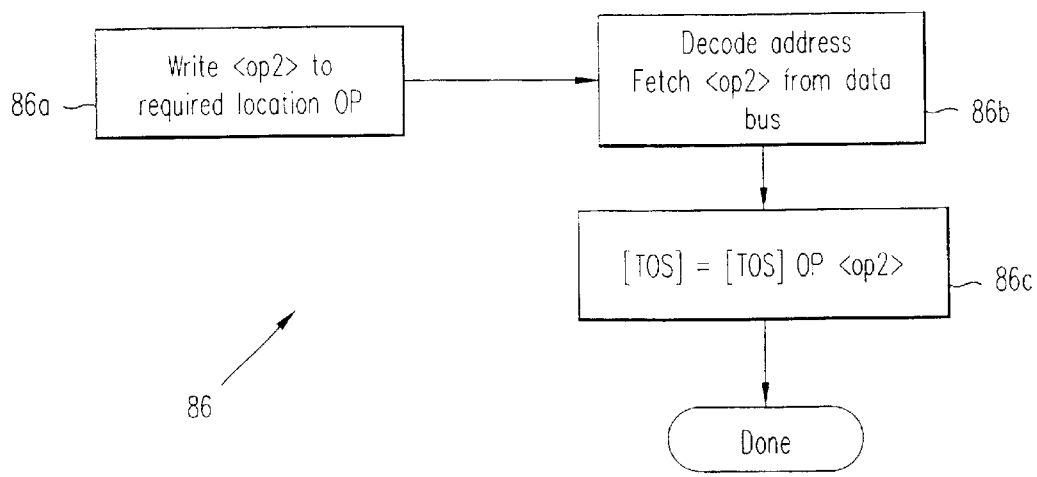
FIG. 9 is a flow diagram of an arithmetic operation according to the present invention.

Referring now to the arithmetic operation 86 shown in FIG. 9, when the program language accelerator software 34 has translated and optimized the Java™ code regarding a particular arithmetic operation, and it is time for such operation to be executed, the write command will be directed to the appropriate location in operation 86*a*. Note that exactly what that appropriate location might be will be dictated by the particular arithmetic operation that is to be performed, as listed previously herein in Table 4. In an operation 86*b*, the address is decoded (by the decoder 46—FIG. 3) and the corresponding data is fetched from that data bus 22 (FIG. 2). Then, in an operation 86*c* the arithmetic operation corresponding to the selected address is performed on the value at the top of stack using the value written from the data bus (FIG. 2) and the result is written into the hardware stack (the cache 38—FIG. 3) at the location pointed by its TOS register.

In a variable store operation 90 (FIG. 11), when the program language accelerator software 34 has translated and optimized the Java™ code regarding a variable store operation, and it is time for such operation to be executed, a write will be directed to the dedicated memory location corresponding to the store operation in the intelligent stack 12 in operation 90*a*. The value written to the data bus 22 should be the absolute memory address of the required local variable to be stored. In an operation 90*b*, the address is decoded (by the decoder 46—FIG. 3). Then, if the required variable is in the stack (as determined in a decision operation 90*c*) the variable value is read from the TOS and stored to its required address and the top of stack is decremented. If the required variable is not in the stack, as determined in the decision operation 88*c*, then the smart DMA controller 14 is initiated to store the variable value from the top of stack and decrement the TOS in an operation 90*e*. If the hardware stack (cache 38) approaches underflow, as determined in a decision operation 90*f*, then the smart DMA controller 14 is initiated to restore the stack content from the main memory 30.

In a variable load operation 88 (FIG. 10), when the program language accelerator software 34 has translated and optimized the Java™ code regarding a variable load operation, and it is time for such operation to be executed, a write will be directed to the dedicated memory location in the intelligent stack 12 in operation 88*a* which is dedicated to the variable store operation. The value written to the data bus 22 should be the absolute memory address of the required local variable to be stored. In an operation 88*b*, the address is decoded (by the decoder 46—FIG. 3). Then, if the required variable is in the stack (as determined in a decision operation 88*c*) the variable value is read from the cache 38 and placed at the top of stack in an operation 88*d*—and the TOS is incremented. If the required variable is not in the stack, as determined in the decision operation 88*c*, then the smart DMA controller 14 is initiated to load the variable value to the top of stack and increment the TOS in an operation 88*e*. If the hardware stack (cache 38) approaches overflow, as determined in a decision operation 88*f*, then the smart DMA controller 14 is initiated to transfer the stack content to the main memory 30 from the hardware stack (cache 38).

Various modifications may be made to the invention without altering its value or scope. For example, although the inventive program language accelerator core 10 and associated program language accelerator software 34 are described herein as being optimized for use with the Java™ program language, the principles involved are equally applicable for use with other program languages, particularly if such languages might be developed primarily for use with stack based systems.

As previously mentioned, yet another likely modification would be to implement the program language accelerator core as a device physically distinct form the CPU chip 18 such that it could more readily be added to existing systems or existing system designs.

INDUSTRIAL APPLICABILITY

The inventive program language accelerator core 10 and the related program language accelerator software 34 are intended to be widely used for the real time execution of Java™ code in conjunction with processors which are otherwise optimized for executing programs written in languages other than Java™. As can be appreciated in light of the above description, the program language accelerator core 10 uses an entirely new concept in that the program language accelerator software, when interpreting the Java™ code for execution in the native code of the native CPU 16 will cause certain operations to be directed to certain virtual memory addresses such that the operation is automatically accomplished by the intelligent stack 12. That is, the intelligent stack 12 will know what operation is to be performed and will perform it based solely on the address to which the data is written in the memory map. This will save from one to several clock cycles per operation where this feature is invoked. Thereby, the speed of execution of Java™ code will be greatly enhanced without burdening the computer 20 with the running of a virtual machine, or the like, in the background.

Since the program language accelerator core 10 of the present invention may be readily produced and integrated into existing designs for systems and devices, and since the advantages as described herein are provided, it is expected that it will be readily accepted in the industry. For these and other reasons, it is expected that the utility and industrial applicability of the invention will be both significant in scope and long lasting in duration.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

What is claimed is:

1. A computer system providing accelerated processing of stack oriented interpretive language instructions, said system comprising:
    a native processing unit for executing native language instructions;
    a translator for translating the interpretive language instructions to native language instructions, for generating address values associated with selected ones of said native language instructions, and for establishing a correlation between each of said address values and a corresponding core operation;
    a dedicated processing accelerator core communicatively coupled with said processing unit, responsive to address values received from said processing unit, and operative to perform core operations, said core including,
        a dedicated hardware stack cache memory device having a plurality of memory address locations addressable by said address values, said locations for storing operand data upon which said core operations are to be performed,
        core control logic responsive to said address values and read/write control signals provided by said native processing unit, operative to control writing and reading of said operand data to and from said cache memory device, and being further operative to determine core operations corresponding with said address values based solely on said correlation established by said translator, and
        an arithmetic logic unit communicatively coupled with said core control logic for receiving said operand data from corresponding ones of said address locations of said cache memory device, and being operative to perform core operations on said operand data, each of said core operations being specified solely by said address values.

2. A computer system as recited in claim 1 wherein said translator is implemented by translation instructions executed by said native processing unit.

3. A computer system as recited in claim 1 wherein said core control logic includes:
    a stack controller for controlling said writing and reading of data to and from said cache memory device in accordance with a stack methodology; and
    a decoder for decoding each of said address values for the purpose of determining said corresponding core operation.

4. A computer system as recited in claim 1 further comprising a main memory unit, and wherein said core control logic further comprises a direct memory access controller operative to shift data from said cache memory device to said main memory unit when said cache memory device approaches a stack overflow condition, and also operative to load data from said main memory unit to said cache memory device when said cache memory device approaches a stack underflow condition.

5. A computer system as recited in claim 4 wherein said direct memory access controller is further operative to:
    load a local variable from said main memory unit to said cache memory device in the event of a Variable Load Miss;
    store a local variable to said main memory unit in the event of a Variable Store miss;
    transfer data from said cache memory device to said main memory unit in order to prepare for a context switch operation; and perform accelerating thread context switching by moving data into and out of said cache memory device as required.

6. A computer system as recited in claim 1 wherein each of said address values includes:
- a plurality of select area bits for selecting from a plurality of memory spaces areas of said cache memory device, each of said areas including a particular set of said address locations; and
- a plurality of select bits for selecting particular ones of each of said address locations of each of said areas, and for determining the operation to be performed.

7. A computer system as recited in claim 1 wherein said interpretive language is Java™.

8. A computer system as recited in claim 1 wherein said core operations include arithmetic operations.

9. A computer system as recited in claim 1 wherein said core operations include Boolean logic operations.

10. In a computer system including a native processing unit for executing native language instructions, and a processing accelerator core coupled for communication with the processing unit, the core including a stack cache memory device having a plurality of memory address locations, control logic operative to control writing and reading of operand data to and from the locations of the cache memory device, and an arithmetic logic unit operative to perform core operations on said operand data, a method of providing accelerated processing of stack oriented interpretive language instructions, the method comprising the steps of:
- receiving interpretive language instructions;
- translating said interpretive language instructions to native language instructions;
- generating address values associated with selected ones of said native language instructions, each of said selected instructions and associated address values corresponding with a core operation;
- writing and reading operand data to and from memory address locations of a dedicated hardware stack cache memory device, said locations being addressable by corresponding ones of said address values, said operand data being associated with corresponding ones of a plurality of core operations to be performed on said operand data; and
- retrieving said operand data from corresponding ones of the locations using said address values, and using an arithmetic logic unit to perform core operations on said operand data, each of said core operations being specified solely by said corresponding address value.

11. In a computer system as recited in claim 10 wherein said step of translating includes executing instructions using the native processing unit.

12. In a computer system as recited in claim 10 wherein said core logic includes:
- a stack controller for controlling said writing and reading of data to and from said cache memory device in accordance with a stack methodology; and
- a decoder for decoding each of said address values for the purpose of determining said corresponding core operation.

13. In a computer system as recited in claim 10 further comprising direct memory access control steps of:
- shifting data from the cache memory device to a main memory unit of the computer system when the cache memory device approaches a stack overflow condition; and
- loading data from said main memory unit to said cache memory device when the cache memory device approaches a stack underflow condition.

14. A computer system as recited in claim 13 further comprising direct memory access control steps of:
- loading a local variable from said main memory unit to said cache memory device in the event of a Variable Load Miss;
- storing a local variable to said main memory unit in the event of a Variable Store miss;
- transferring data from said cache memory device to said main memory unit in order to prepare for a context switch operation; and
- performing accelerating thread context switching by moving data into and out of said cache memory device as required.

15. A computer system as recited in claim 13 wherein each of said address values includes:
- a plurality of select area bits for selecting from a plurality of memory spaces areas of said cache memory device, each of said areas including a particular set of said address locations; and
- a plurality of select bits for selecting particular ones of each of said address locations of each of said areas, and for determining the core operation to be performed.

16. A computer system as recited in claim 10 wherein said interpretive language is Java™.

17. A computer system as recited in claim 10 wherein said core operations include arithmetic operations.

18. A computer system as recited in claim 10 wherein said core operations include Boolean logic operations.

19. A method of providing accelerated processing of stack oriented interpretive language instructions, the method comprising the steps of:
- translating interpretive language instructions to native language instructions;
- generating address values associated with selected ones of said native language instructions, each of said address values being associated with corresponding core operation;
- writing and reading operand data to and from storage locations of a dedicated hardware stack cache memory device, said locations being addressable by corresponding ones of said address values; and
- retrieving said operand data from corresponding ones of the storage locations using said address values, providing said operand data to an arithmetic logic unit, and using the arithmetic logic unit to perform core operations on said operand data, each of said core operations being specified solely by said corresponding address values used to retrieve said operand data.

20. An accelerator core for a processing unit, comprising:
- an arithmetic logic unit (ALU) for performing operations on at least one operand provided to the ALU;
- a stack cache memory device having a plurality of storage locations, each location being addressable by an address value specified by a translator that associates the address value with a core operation, the memory device being configured to store at least one operand at a location whose address value corresponds to the operation to be performed on the operand, and to provide at least one operand to the ALU; and
- a controller communicatively coupled to the memory device and the ALU, responsive to a memory address value indicating a location of the memory device, operative to access an operand from the location, to provide the operand to the ALU, and to specify the operation to be performed on the operand by the ALU based solely on the address value used to access the operand.

21. An accelerator core as recited in claim 20 wherein the memory device is comprised of a stack cache memory device.

22. An accelerator core as recited in claim 21 wherein the controller includes:

a stack controller for controlling writing and reading of at least one operand to and from the cache memory device in accordance with a stack methodology; and a decoder for decoding an address value for the purpose of determining an operation to be performed by the ALU.

23. An accelerator core as recited in claim 22 wherein the storage locations in the memory device are organized in a plurality of memory areas, and wherein each of the address values includes:

at least one select area bit for indicating a selected one of the areas; and a plurality of select bits for selecting a particular one of the storage locations in the selected area.

24. An accelerator core as recited in claim 20 wherein the translator is further operative to translate interpretive language instructions to native language instructions.

25. An accelerator core as recited in claim 20 wherein the operations include arithmetic operations.

* * * * *